United States Patent [19]

Caggiano et al.

[11] Patent Number: 5,640,294
[45] Date of Patent: Jun. 17, 1997

[54] AUTOMATED CIRCUIT BREAKER SUPPORT SADDLE ASSEMBLY

[75] Inventors: Robert Joseph Caggiano, Wolcott; Thomas Michael Palmer, Wallingford; Mark Lech, Middletown; Dean Arthur Robarge, Southington; David Arnold Reid, Forestville, all of Conn.; Thomas McDonald, Henderson, Ky.; Timothy Wayne Webber, Nashua, N.H.; George Thomas Parker, Morristown, Tenn.

[73] Assignee: General Electric Company, New York, N.Y.

[21] Appl. No.: 548,238

[22] Filed: Oct. 25, 1995

[51] Int. Cl.⁶ ........................................ H02B 1/04
[52] U.S. Cl. ................................ 361/637; 361/627
[58] Field of Search ................ 174/59, 68.2, 708; 248/220.2, 223.3, 224.4, 225.1; 361/627, 634, 636, 637, 639, 640, 648, 650, 652, 658; 439/207, 211, 212, 460, 571-574

[56] References Cited

U.S. PATENT DOCUMENTS

| | | |
|---|---|---|
| 4,251,851 | 2/1981 | Dierring et al. ............... 361/652 |
| 4,646,198 | 2/1987 | Rich et al. ..................... 361/627 |
| 4,733,329 | 3/1988 | Barner et al. .................. 361/355 |
| 5,272,591 | 12/1993 | Blue et al. ..................... 361/622 |
| 5,272,592 | 12/1993 | Harris et al. ................... 361/367 |
| 5,337,211 | 8/1994 | Reiner et al. ................... 361/637 |
| 5,340,945 | 8/1994 | Gehrs et al. ................... 174/174 |
| 5,450,282 | 9/1995 | Webber et al. ................. 361/637 |

Primary Examiner—Gregory D. Thompson
Attorney, Agent, or Firm—Richard A. Menelly; Carl B. Horton

[57] ABSTRACT

A fully automated circuit breaker saddle assembly in the form of a plastic support base having modular components that define the end and central sections of the support base. The components are snappingly fitted together and are retained by means of formations on the ends of the respective components. The metal circuit breaker stab assemblies are attached to the base by connectors integrally-formed in the base.

4 Claims, 4 Drawing Sheets

AUTOMATED CIRCUIT BREAKER SUPPORT SADDLE ASSEMBLY

BACKGROUND OF THE INVENTION

The use of plastic circuit breaker support saddles is described in U.S. Pat. No. 5,450,282 entitled "Circuit Breaker Support Saddle for Automated Assembly". The components are assembled by means of complimentary attachment features integrally-formed within the separate components to obviate the requirement of screws, bolts and the like to connect between the metal current carrying components and the electrically-resistant plastic support structure.

Other interconnection arrangements are described within the following U.S. Patents that represent the state of the art of automatic assembly of circuit breaker plastic support saddles.

U.S. Pat. No. 5,337,211 entitled "Electrical Load Center Interior Panel Having Molded Insulating Support Panel with Snap-in Bus Bars" discloses shelves formed within a support saddle to receive and support the busbars.

U.S. Pat. No. 5,340,945 entitled "Panelboard with Insulative Snap-in Support Means" teaches the use of plastic pins protruding from the plastic support to position and support the busbars on the support. The pins are inserted within apertures on the busbars and ultrasonically staked to securely hold the busbars to the support.

U.S. Pat. Nos. 5,272,591 and 5,272,592 entitled "Protective Cover for Electrical Bus Bars" and Panelboard Interior Assembly" respectively, both describe the use of pins upstanding from the support base and extending within apertures in the busbars to position and support the busbars on the support base U.S. Pat. No. 4,733,329 entitled "Three Phase Load Center" describes the use of plastic fasteners that extend through apertures in both the base pan and the busbars to fasten the busbars to the base pan.

SUMMARY OF THE INVENTION

A circuit breaker plastic support saddle is formed from modular end and center components that are fitted together to form a variety of lengths. Tapered plastic snap fingers upstanding from the support saddle and integrally-formed therewith, extend through apertures in the bus bars to secure the bus bars without ultrasonic staking.

DESCRIPTION OF THE PREFERRED EMBODIMENT

Figure 1:
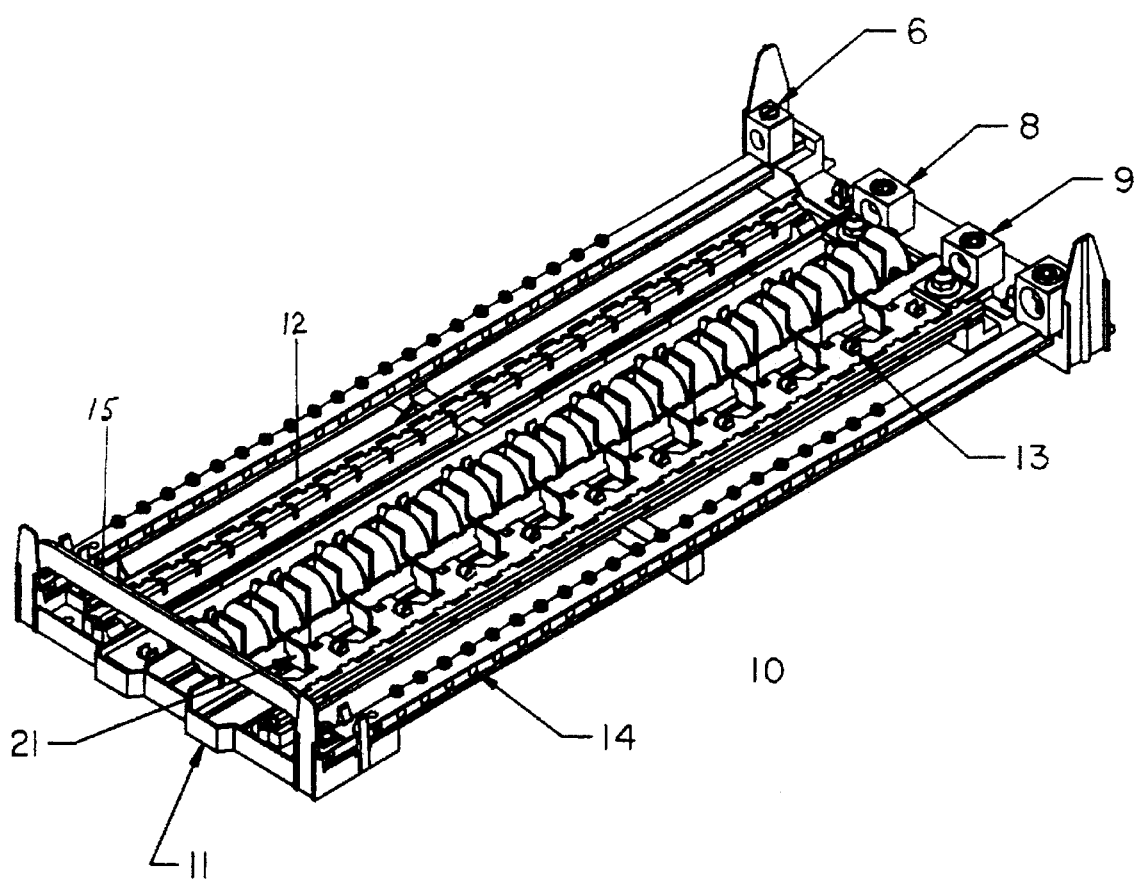
FIG. 1 is a top perspective view of a completely assembled circuit breaker support saddle according to the invention.
Figure 4:
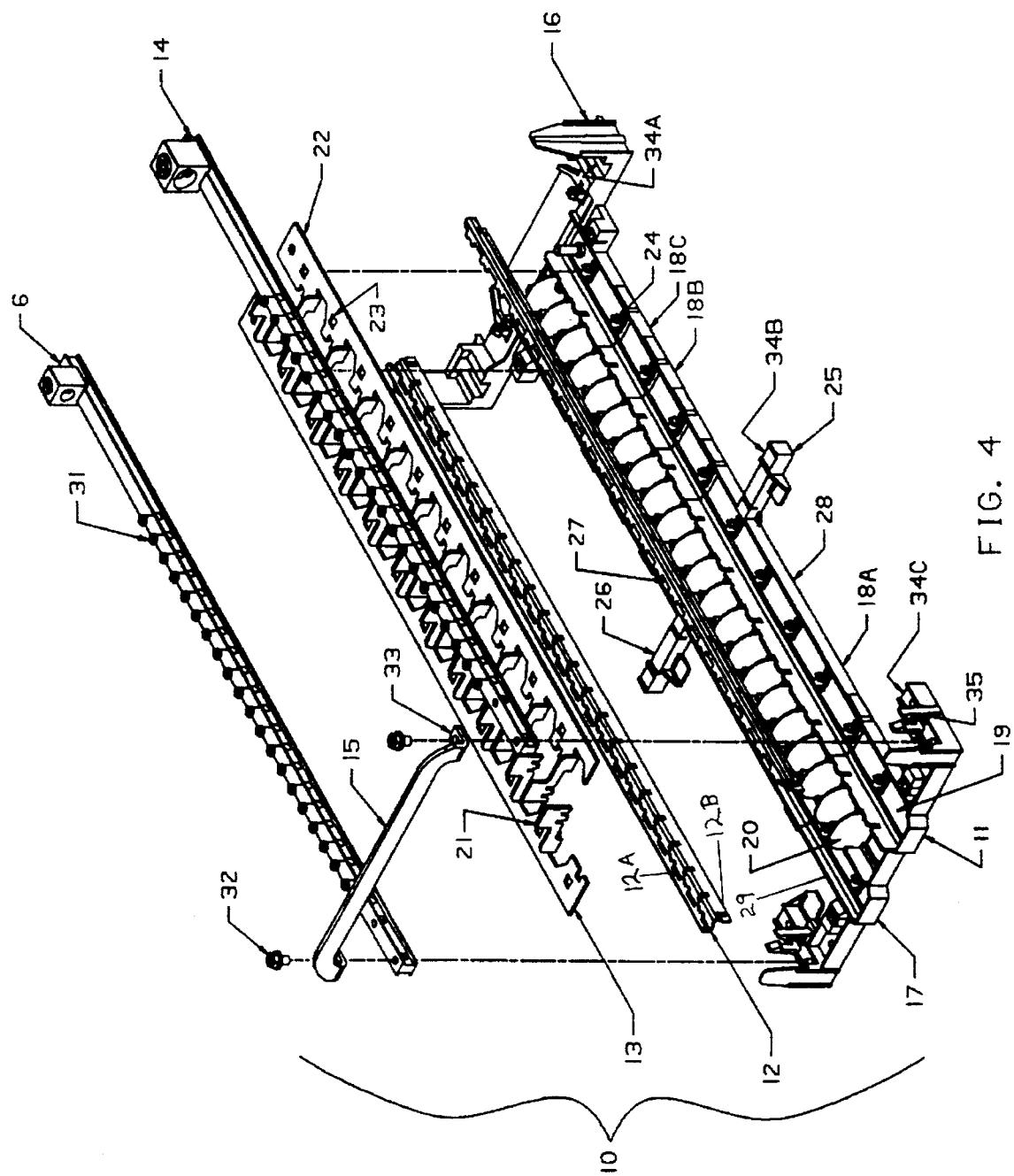
FIG. 4 is a top perspective view of the support saddle of FIG. 1 prior to attaching the bus bars and neutral terminal strap thereto.

The support saddle 10 of FIG. 1 is similar to that described in aforementioned U.S. Pat. No. 5,450,282 entitled "Circuit Breaker Support Saddle for Automated Assembly" and consists of a plastic base 11 molded from a thermoplastic material, such as Noryl, which is a trademark of the General Company for synthetic thermoplastic resins for molding and extrusions. The base supports a pair of busbars 13 which are shaped to provide a plurality of upstanding load stabs as indicated at 21. Also supported on the base are a pair of neutral buses 14 that carry the neutral lugs 6 at one end and are interconnected by means of the neutral bus connector 15 at their opposite ends. The circuit breakers (not shown) are attached to the support saddle by means of the circuit breaker hooks 12A arranged on the side rails 12, which are shown in FIG. 4. The line lugs 8, 9 connect the circuit breaker load stabs 21 with the external electrical distribution circuit (not shown).

Figure 2:
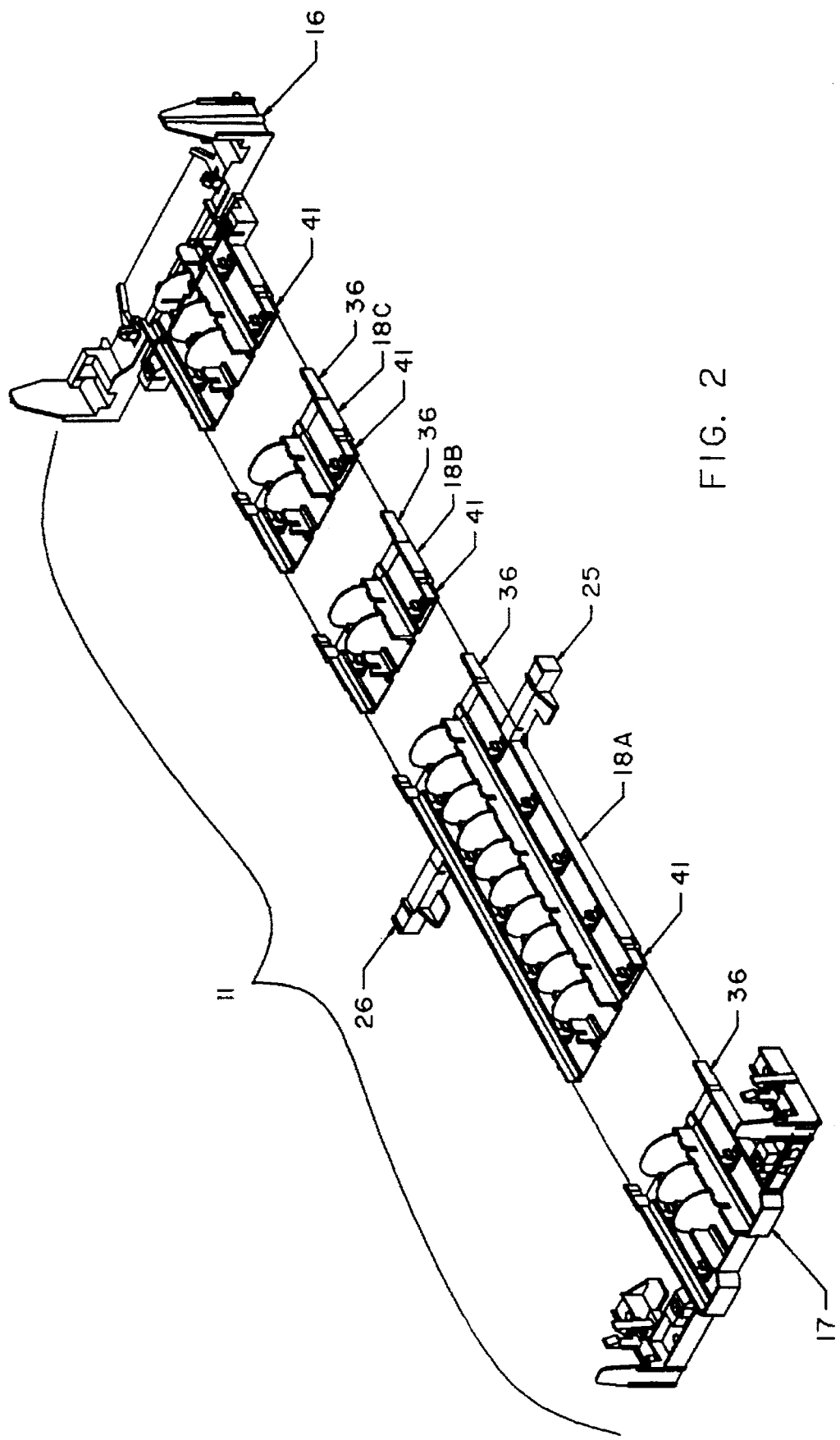
FIG. 2 is an enlarged top perspective view of the support saddle of FIG. 1 prior to connection of the center support modules with each other and with the end support modules.

The base 11 is first assembled in an automated process as shown in FIG. 2 wherein the center modules 18A, 18B and 18C of various lengths, are assembled together before the top end module 16 and the bottom end module 17 are attached to the opposing ends to complete the base assembly. The longest center module 18A includes the extending support braces 25, 26 which receive and support the neutral buses 14 (FIG. 4). The connection between the center modules is made by inserting the clips 36 formed on one end of the center modules within the retainers 41 formed on the opposite end of the center module 18C. When the center modules are attached together, the top end module 16 is attached to center module 18C by inserting the clips 36 on the center module 18C within the retainers 41 on the bottom end module 16. The bottom end module 17 is then attached to the center module 18A by inserting the clips 36 on the bottom end module 17 within the retainers 41 on the center module 18A to complete the base assembly. Although the retainers and clips are depicted on the end modules and center modules respectively, the retainers could be formed on the end modules and the clips formed on the center modules if so desired.

Figure 3:
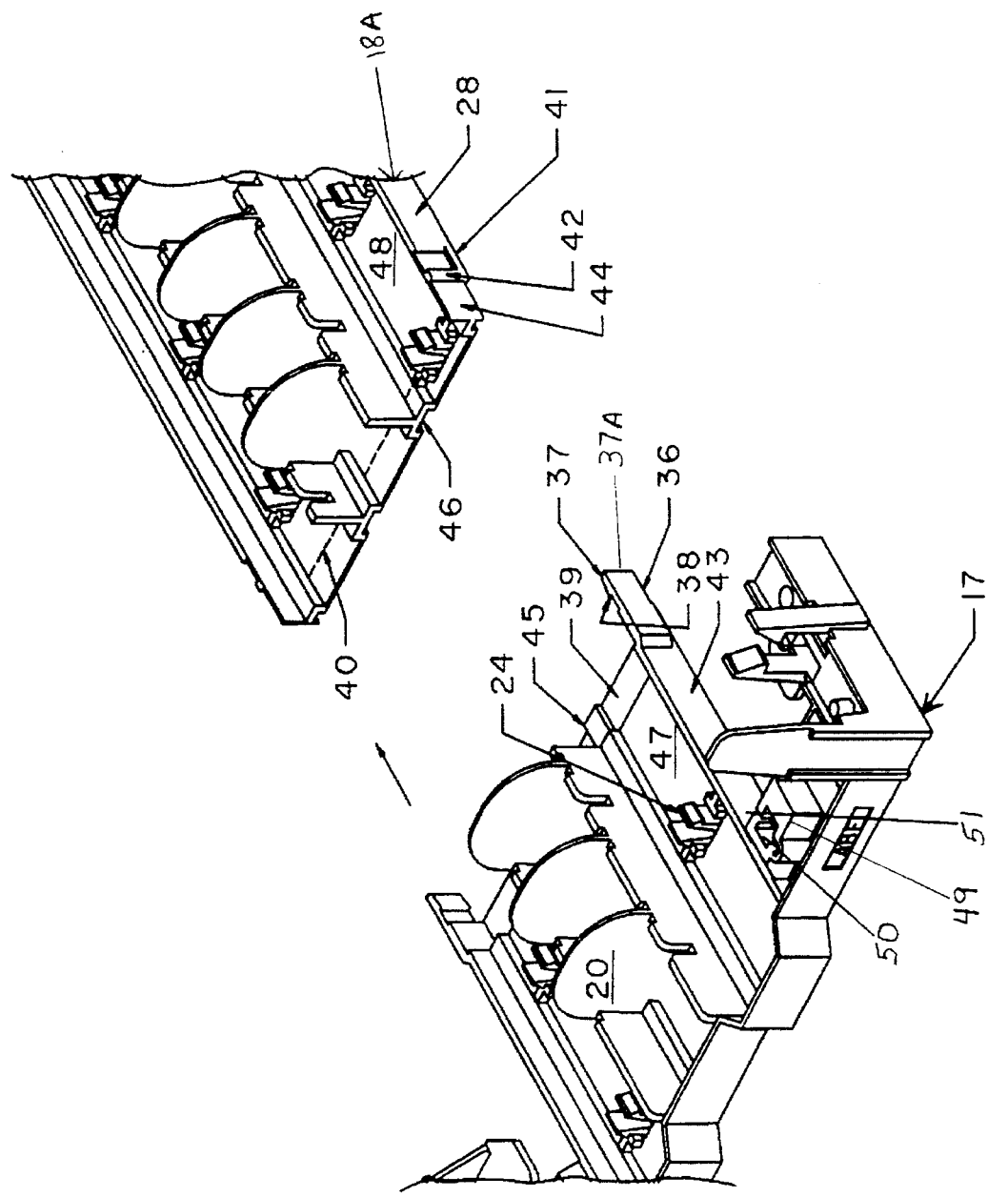
FIG. 3 is an enlarged top perspective view of the center support modules prior to their connection.

The details of the clips 36 and retainers 41 are best seen by now referring to FIG. 3 where the bottom end module 17 is positioned next to the center module 18A prior to attachment. The split tabs 24 extending from the bottom 47 of the bottom end module 17 and from the bottom 48 of the center module 18A form an important feature of the invention and will be described below in greater detail. The upstanding baffles 20 separate the various circuit breaker stab connectors (not shown) in the manner described within the aforementioned U.S. Pat. No. 5,450,282. To support and accommodate automated alignment and assembly, the step 39 formed on the bottom 47 of the bottom end module 17 is positioned next to the shelf 40 formed on the undersurface of the bottom 48 of the center module 18A such that the step 45 slides under the shelf 46 when the clips 37 are received within the retainers 41. The clips 37 include a tapered front 37A and vertical slot 38 that protrude outward from the side wall 43 all integrally-formed with the bottom end module. The retainers 41 include a shelf 44 coplanar with the side wall 28 and a ridge 42 projecting therefrom. When the clips are inserted within the retainers, the ridges 42 become captured within the vertical slots 38 and cannot be easily removed without requiring a special tool. The side rails 12 shown earlier in FIG. 2 are attached to the base by means of the side rail supports 49 integrally formed within the end modules and consisting of a cavity 50 having a slot 51 formed on a front perimeter thereon.

Once the top end, bottom end, and center modules 16,17, 18(A–C) are attached together to form the base 11, the busbars 13, neutral buses 14 and neutral bus connector 15 are then attached to the base in the manner depicted in FIG.

4 to complete the support saddle 10. The busbars 13 carrying the load stabs 21 that are shaped from the flat support plate 22 are first positioned on the base 11 such that the individual load straps 27 are separated by the baffles 20 to insure good electrical oversurface clearance between the individual load straps. The flat support plates are positioned within the channels 19 defined within the sidewalls 28, on one side of the base and also within the sidewalls 29 on the opposite side thereof. The rectangular slots 23 arranged along the flat support plate receive and capture the upstanding split tabs 24 for securing the flat plates and associated load stabs 21 to the base. The neutral buses 14 are positioned on the base outboard the load stabs within the tracks 34A, 34B, 34C formed within the top end module 16, and are located within the support braces 25, 26 and the bottom end module 17 and are snappingly received within the bifurcated plastic posts 35 upstanding from the top and bottom end modules 16, 17. The neutral bus connector 15 is attached to the neutral buses 14 by means of the thru-holes 33 and screws 32. External electrical connection with the neutral buses is made by the neutral lugs 6 and internal electrical connection with the associated circuit breakers (not shown) is made by means of the terminal screws 31. The side rails 12 that carry the circuit breaker support hooks 12A are positioned on the base by inserting the bottom rails 12B that extend along the side rails on the bottom thereof, within the slots 51 formed within the side rail supports 49, that were described earlier with reference to FIG. 3.

We claim:

1. A circuit breaker support saddle comprising:

a plastic support base containing a top end module at one end and a bottom end module at an opposite end of said support base;

a center module intermediate said top and bottom end modules;

insertion means on said bottom end module;

retainer means on one end of said center module, said insertion means being received within said retainer means for attaching said center module to said top end module;

an end module split tab extending from said top end module;

a center module split tab extending from said center module;

a circuit breaker bus bar defining a flat plate having a plurality of upstanding circuit breaker stabs, said bus bar being arranged on said top end module and said center module, a plurality of apertures in said flat plate, one of said apertures capturing said top end module split tab and another of said apertures capturing said center module split tab thereby retaining said bus bar on said top end module and said center module, said top end module includes a top end module bottom and a top end module side wall extending from said bottom, and wherein said insertion means defines a clip in the form of a tapered part extending from an end of said top end module side wall and a vertical slot formed within said clip.

2. The support saddle of claim 1 wherein said center module includes a center module bottom and a center module side wall extending from said center module bottom, and wherein said retainer means defines a ridge protruding from said center module side wall, said ridge being captured within said vertical slot when said clip is moved over said ridge.

3. A circuit breaker support saddle comprising:

a plastic support base containing a top end module at one end and a bottom end module at an opposite end of said support base;

a center module intermediate said top and bottom end modules;

insertion means on an end of said top end module;

retainer means on one end of said center module, said insertion means being received within said retainer means for attaching said top end module to said center module;

an end module split tab extending from said top end module;

a center module split tab extending from said center module;

a circuit breaker bus bar defining a flat plate having a plurality of upstanding circuit breaker stabs, said bus bar being arranged on said top end module and said center module, a plurality of apertures in said flat plate, one of said apertures capturing said top end module split tab and another of said split tabs capturing said center module split tab thereby retaining said bus bar on said top end module and said center module, said top end module includes a top end module bottom and a top end module side wall extending from said bottom, and wherein said insertion means defines a clip in the form of a tapered part extending from an end of said top end module side wall and a vertical slot formed within said clip.

4. The support saddle of claim 3 wherein said center module includes a center module bottom and a center module side wall extending from said center module bottom, and wherein said retainer means defines a ridge protruding from said center module side wall, said ridge being captured within said vertical slot when said clip is moved over said ridge.

* * * * *